(12) United States Patent
Ding et al.

(10) Patent No.: US 8,948,522 B2
(45) Date of Patent: Feb. 3, 2015

(54) ADAPTIVE THRESHOLD FOR OBJECT DETECTION

(75) Inventors: Yuanyuan Ding, Santa Clara, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 785 days.

(21) Appl. No.: 13/198,412

(22) Filed: Aug. 4, 2011

(65) Prior Publication Data

US 2013/0034263 A1 Feb. 7, 2013

(51) Int. Cl.
 *G06K 9/62* (2006.01)
 *G06K 9/46* (2006.01)
(52) U.S. Cl.
 CPC .............. *G06K 9/624* (2013.01); *G06K 9/6269* (2013.01); *G06K 9/4642* (2013.01)
 USPC ........... 382/224; 382/155; 382/156; 382/159; 382/181
(58) Field of Classification Search
 USPC ........................... 382/155, 161, 181, 224, 231
 See application file for complete search history.

(56) References Cited

U.S. PATENT DOCUMENTS

| 7,480,414 | B2 | 1/2009 | Brown et al. | |
|---|---|---|---|---|
| 7,840,061 | B2 | 11/2010 | Porikli et al. | |
| 7,853,071 | B2 | 12/2010 | Friedhoff et al. | |
| 8,144,932 | B2 * | 3/2012 | Okada et al. | 382/103 |
| 2006/0293777 | A1 * | 12/2006 | Breitgand et al. | 700/108 |
| 2008/0260239 | A1 * | 10/2008 | Han et al. | 382/156 |
| 2010/0329544 | A1 * | 12/2010 | Sabe et al. | 382/159 |
| 2011/0158536 | A1 * | 6/2011 | Nakano et al. | 382/190 |
| 2012/0045132 | A1 * | 2/2012 | Wong et al. | 382/195 |

OTHER PUBLICATIONS

Tappen, M.F., et al., "Estimating Intrinsic Component Images Using Non-Linear Regression", Computer Vision and Pattern Recognition, 2006 IEEE Computer Society Conference.

Rowley, H.A., et al., "Neural Network-Based Face Detection", PAMI, Jan. 1998.

* cited by examiner

*Primary Examiner* — Edward Park

(57) ABSTRACT

Systems and methods for developing and using adaptive threshold values for different input images for object detection are disclosed. In embodiments, detector response histogram-based systems and methods train models for predicting optimal threshold values for different images. In embodiments, when training the model, an optimal threshold value for an image is defined as the value that maximizes the reduction of false positive image patches while preserving as many true positive image patches as possible. Once trained, the model may be used to set different threshold values for different images by inputting a detector response histogram for the image patches of an image into the model to determine a threshold value for detection.

13 Claims, 10 Drawing Sheets

900

Using Adaptive Threshold Value
905

Using Optimal Threshold Value
910

ADAPTIVE THRESHOLD FOR OBJECT DETECTION

BACKGROUND

1. Field of Invention

The present patent document is directed towards systems and methods for object detection. More particularly, the present patent document is directed towards systems and methods that provide adaptive threshold values for different input images.

2. Description of the Related Art

Object detection from images can be important to many applications, such as manufacturing, surveillance, robotics, and security. Predominant approaches for object detection usually scan the images with sliding windows at various scales to identify the locations and scales of the contained object. To determine whether a local window includes the object of interest, discriminative approaches extract image features in a local window and construct classifiers for detection. The local features are then used to identify the object in the classification process by algorithms such as AdaBoost or support vector machine (SVM). In typical object detection systems, a detector outputs a continuous value, and a threshold value is used to compare with the detector output to make a final classification decision. That is, whether the object of interest is deemed to be in a local window of the image is based upon whether or not the response value is greater than a threshold value. Although different values may be evaluated to find an acceptable threshold value, a single value is used globally for all input images.

Consider the receiver operating characteristic (ROC) curve depicted in FIG. 1. FIG. 1 shows an ROC curve 105 that balances performance metrics of recall (on the x-axis) and precision (on the y-axis). Recall represents a measure of the ability of a detector to detect all of the objects of interest in an image or images. Precision represents a measure of the ability of a detector to correctly detect only the objects of interest in an image or images. Thus, a detector may have high recall by selecting a large number of image patches, but a significant number of those patches may be false positives. A detector may have high precision, meaning that the detected images patches contain few, if any, false positives, but such a detector may improperly exclude image patches that should have been included (i.e., the detector results have a high false negative rate). Thus, a balance is typically struck that allows for a compromise of precision and recall. For example, the recall rate 110 is selected and where that rate 110 intersects the ROC curve 105 at point 115 is the threshold value. Note that the threshold value must be lie upon the ROC curve. As noted previously, this single threshold value is used for any arbitrary image.

However, using a single threshold value regardless of the input image can be problematic. Detection is among the most challenging vision tasks due in part to the great variety of appearances and shapes of objects, variability of environments, and variability in image quality. Having a single threshold value regardless of the input image can produce less than optimal detection results. Accordingly, systems and methods are needed that can provide flexibility when trying to detect an object or item in an image.

SUMMARY OF INVENTION

The present invention includes systems and methods for generating detection models that provide adaptive thresholding and for using detection models with adaptive thresholding. In embodiments, detector response systems and methods train models for predicting optimal threshold values for different images. In embodiments, when training the model, an optimal threshold value for an image is defined as the value that maximizes the reduction of false positive image patches while preserving as many true positive image patches as possible. Once trained, the model may be used to set a threshold value for an input image by inputting a detector response histogram for the image patches from that image into the model to determine a threshold value for detection.

In embodiments, a method for training an adaptive thresholding model for detecting an object in an image comprises, for each training image in a set of training images, performing the steps of: obtaining image patches and their associated detector response values; computing an optimal threshold value using the detector response values and the ground truth for the training image; and computing a normalized histogram of the detector response values. Having performed the steps for each of training image, each training image has an associated normalized histogram and optimal threshold value. The histograms and threshold values are used to train a model to predict an optimal threshold value for an image given a normalized histogram of detector response values. It shall be noted that what "optimal" means may be selected or defined by the user. In embodiments, the optimal threshold is one that minimizes the number of false positive images patches for the training image and that maximizes the number of true positive image patches for the training image.

In embodiments, the image patches and detector response values may be obtained from various detectors, such as AdaBoost, Support Vector Machine detector, and the like.

In embodiments, the model may be a regression model, such as a neural network. However, it shall be noted that other models may be used and trained.

In embodiment, a method for using an adaptive thresholding detector to detect an object in an image comprises obtaining a set of candidate patches from the image and computing a normalized histogram of the detector response values of the set of candidate patches. This normalized histogram is input into the adaptive thresholding model to obtain a threshold value. The outputted threshold value is used to classifying the candidate patches as containing or not containing the object. In embodiments, candidate patches that satisfy the comparison (e.g., its detector response value exceeds the threshold value) are classified as containing the object.

Embodiments of the present invention include methods that have been encoded upon one or more non-transitory computer-readable media with instructions for one or more processors or processing units to perform. A method may include a plurality of instructions that are executed by one or more processors.

Detection of humans are used herein for illustration purposes only and shall not limit application of the present invention; one skilled in the art shall recognize that the present disclosure may be used or adapted for use in detecting other items.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the scope of the invention to these particular embodiments.

DESCRIPTION OF THE PREFERRED EMBODIMENTS

Figure 1:
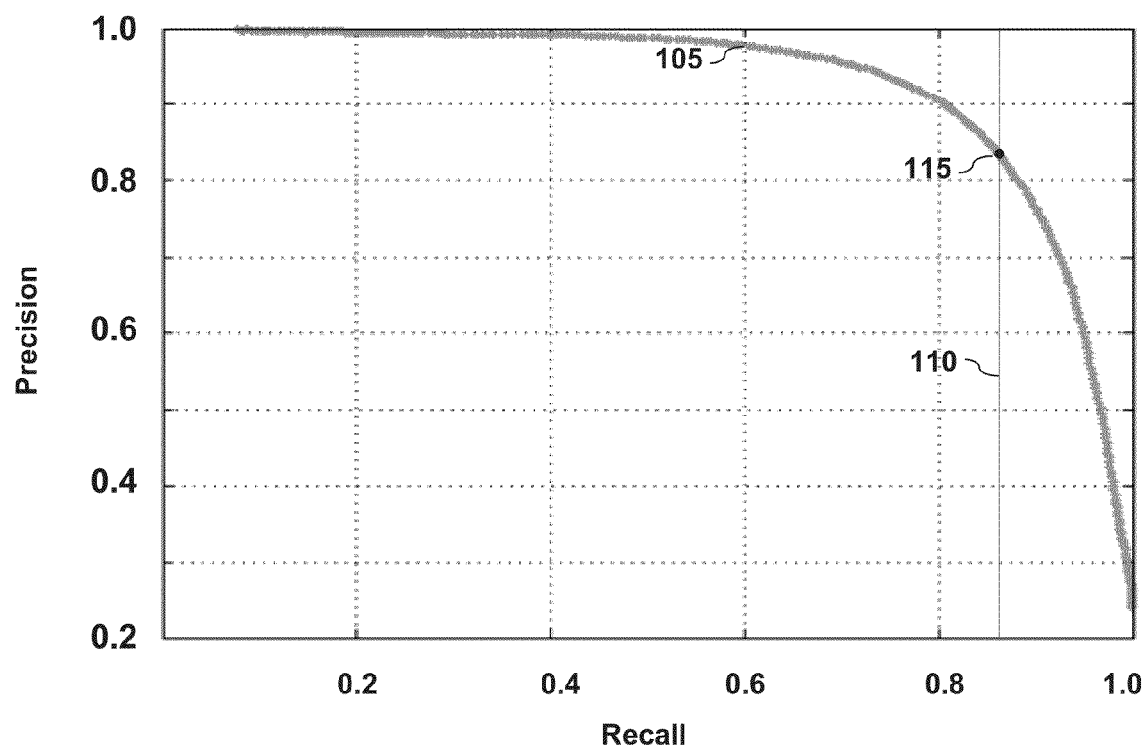
FIG. 1 depicts a typical ROC curve for image detection, in which a single threshold value on the curve is selected for all input images.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the figures described herein are illustrative of specific embodiments of the invention and are meant to avoid obscuring the invention.

It shall be noted that some of the steps presented herein may be performed in different order but achieve the same or similar results. One skilled in the art shall recognize that certain steps may be performed before, after, or at the same time as other steps. Accordingly, the listing of steps, including in the claims, does not imply a required sequential order.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

Background

As previously noted, prior methods for detecting objects within an image were limited because these methods typically employed a single threshold value. The rigid approach did not provide sufficient flexibility to improve the detector output results. Accordingly, for different input images (e.g., images with different complexity of background structures, different illumination conditions, different contrast ratio, and so forth), allowing for different threshold values can better reduce false positives image patches while preserving true positive image patches. The present invention addresses this problem by providing systems and methods for object detection that have adaptive thresholding.

Detection models usually consist of two parts: (1) training a model, and (2) classification or detection, which uses the trained model for object detection. Aspects of the present invention include systems and methods for generating detection models that provide adaptive thresholding and systems and methods for using detection models with adaptive thresholding.

Adaptive Threshold Model Training

Figure 2:
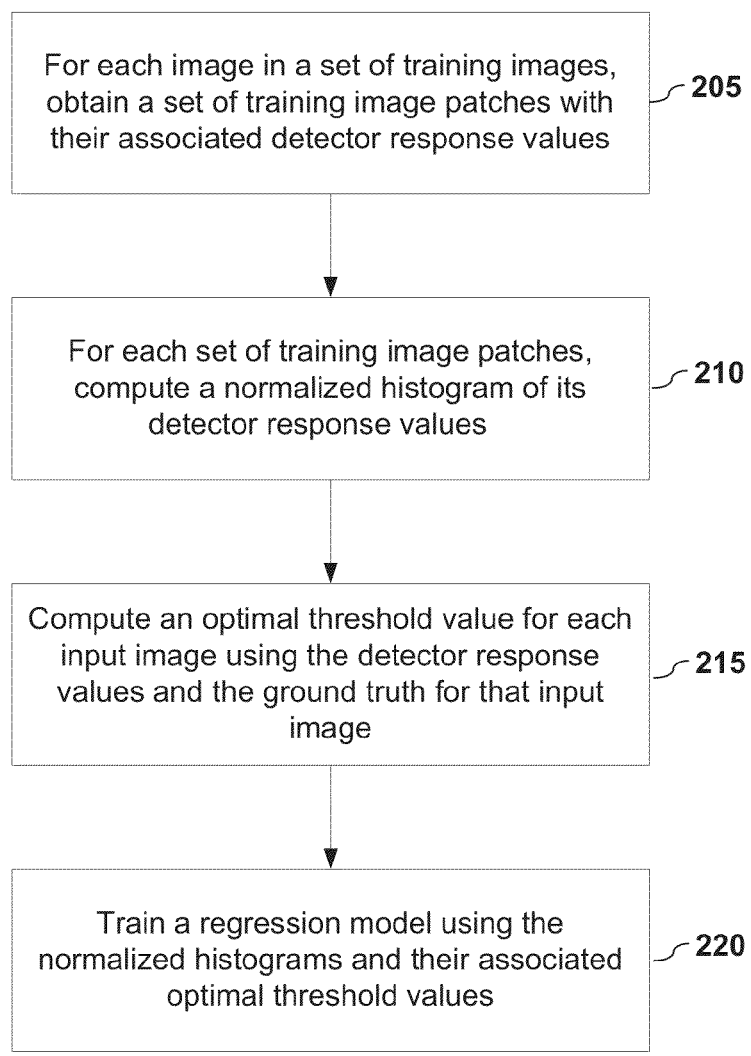
FIG. 2 depicts a method for training a model for adaptively determining a detection threshold value according to embodiments of the present invention.
Figure 3:
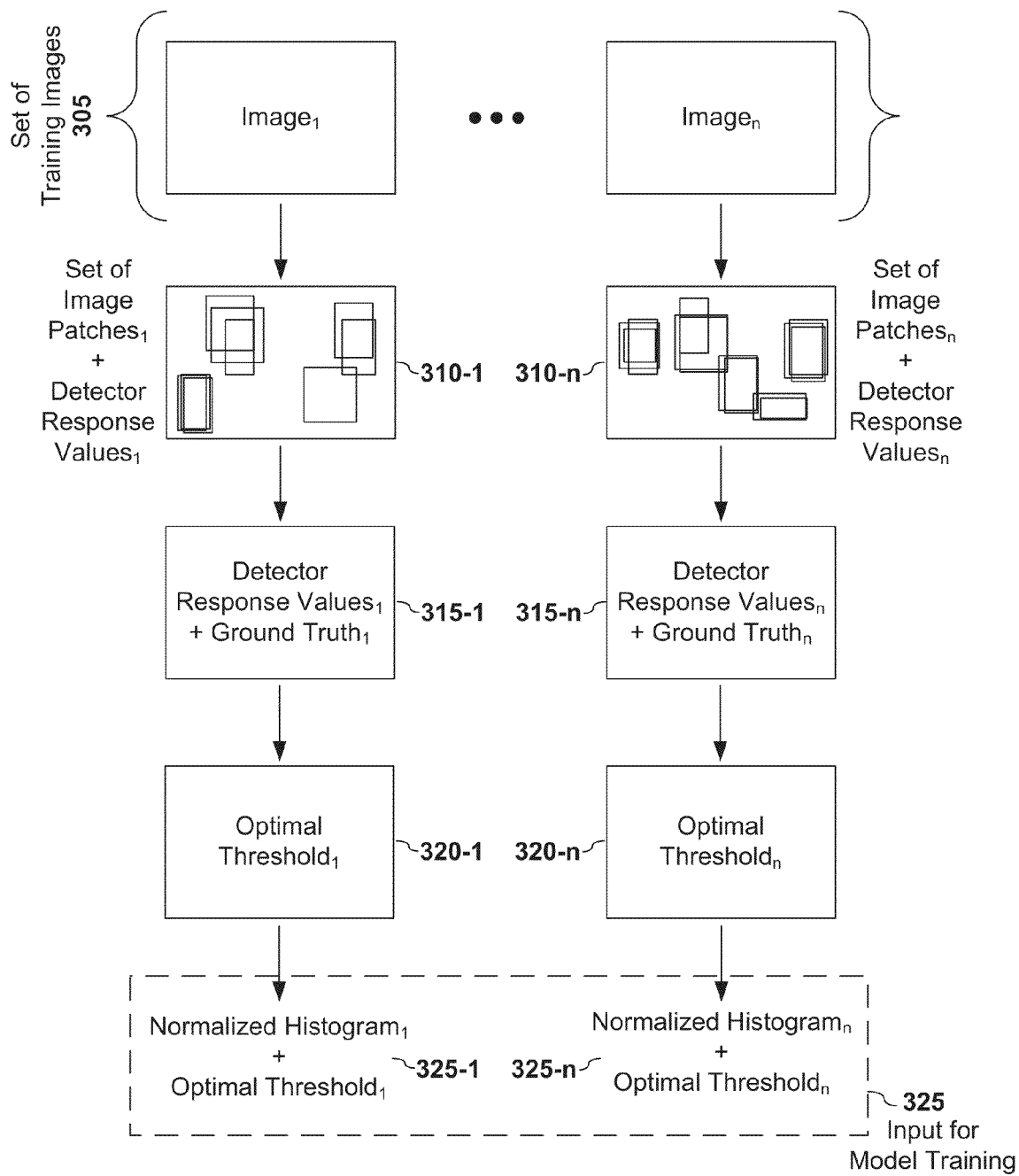
FIG. 3 graphically depicts a method for training a model for adaptively determining a detection threshold value according to embodiments of the present invention.

FIG. 2 depicts a method for training a model for adaptively predicting an optimal detection response threshold value according to embodiments of the present invention. FIG. 3 graphically depicts the method of FIG. 2 for training a model for adaptively determining a detection threshold value according to embodiments of the present invention. As illustrated, in embodiments, a set of training image 305 (e.g., Images$_1$-Image$_n$ in FIG. 3) are used to produce (205) sets of training image patches 310 with their associated detector response values for each training image in the set of training images. It shall be noted that a "set" as used herein may contain any number of items. In embodiments, the set of training image patches and their associated detector response values may be obtained by using a detector to identify patches that may contain the object of interest in each of the training images. The detector may be an existing detector or detectors, such as AdaBoost or SVM; alternatively, other detectors may be used. For example, a contextual boost detector, which is described in U.S. Patent Application No. 61/447,570, filed on Feb. 28, 2011, entitled "CONTEXTUAL BOOST FOR PEDESTRIAN DETECTION", and listing as inventors Yuanyuan Ding and Jing Xiao, may be used. The aforementioned patent document is incorporated by reference herein in its entirety.

Figure 4:
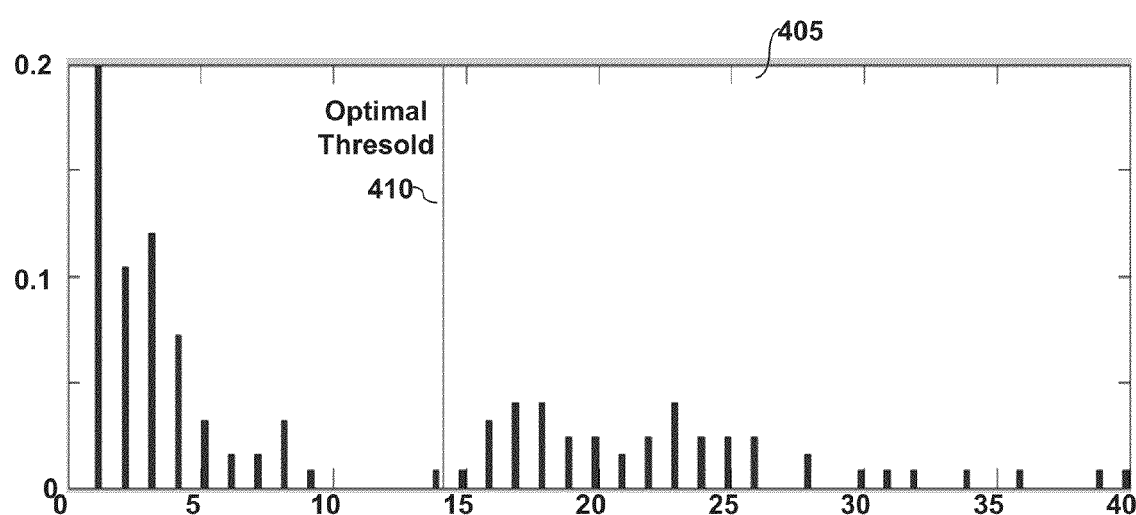
FIG. 4 illustrates an example of an optimal threshold value for a normalized histogram of object detection response values according to embodiments of the present invention.

For each input image, the detector response values from the set of training image patches 310 are formed (210) into a normalized histogram of detector values. FIG. 4 illustrates an example of a normalized histogram 405 of detector values according to embodiments of the present invention. The y-axis represents relative frequency and the x-axis represents the detector response values.

An optimal threshold value 320 for each input image is obtained (215) using the detector response values for that image and its ground truth data. Because the ground truth for each of the input training images is known, it can be determined whether or not an image patch contains the object of interest. In embodiments, each of the training image patches may have a label associated with it. The label of each image patch indicates whether the image patch contains the object of interest (true positive) or does not contain the object of interest (false positive). In embodiments, what is considered as "optimal" may be user-selected or user-defined; however, in embodiments presented herein, an "optimal" threshold value for a set of image patches from an image is that threshold value that maximizes the selection of true positive image patches while minimizing the selection of false positive image patches. In embodiments, the optimal value may be obtained by examining the precision and recall values for different threshold values. One skilled in the art shall recognize that a number of different approaches may be used to obtain the optimal threshold value. Returning to FIG. 4, a sample optimal threshold 410 for the normalized histogram 405 is displayed according to embodiments of the present invention.

Following step 215 (FIG. 2), a normalized histogram of detector response values and an associated optimal threshold value exists for each set of image patches. This set of normalized histograms and associated optimal threshold values is used (220) to train a model for adaptively determining a threshold value. In embodiments, each normalized histogram forms a vector and, along with its associated optimal threshold value, is inputted (220) into a regression model to train it. In embodiments, the model is trained to take as an input a normalized histogram vector and predict an optimal threshold value. In embodiments, the regression model may be a neural network; however, one skilled in the art shall recognize that a number of different regression models exist and that no particular implementation is critical. Once trained, this model may be used as part of a detection system to adaptively set threshold values.

Detecting Using an Adaptive Threshold Model

Figure 5:
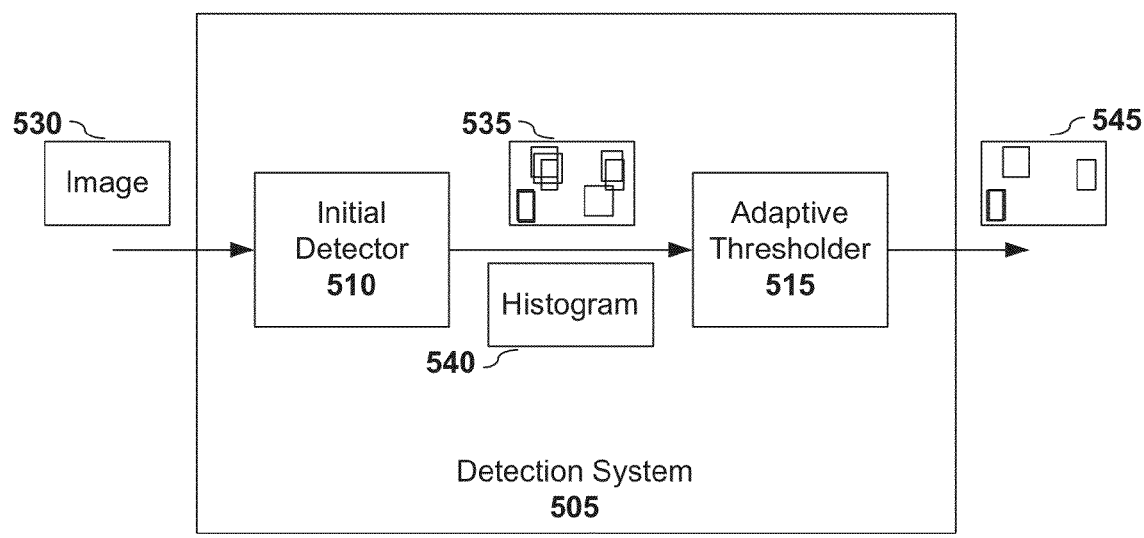
FIG. 5 depicts a detection system that includes adaptive thresholding according to embodiments of the present invention.
Figure 6:
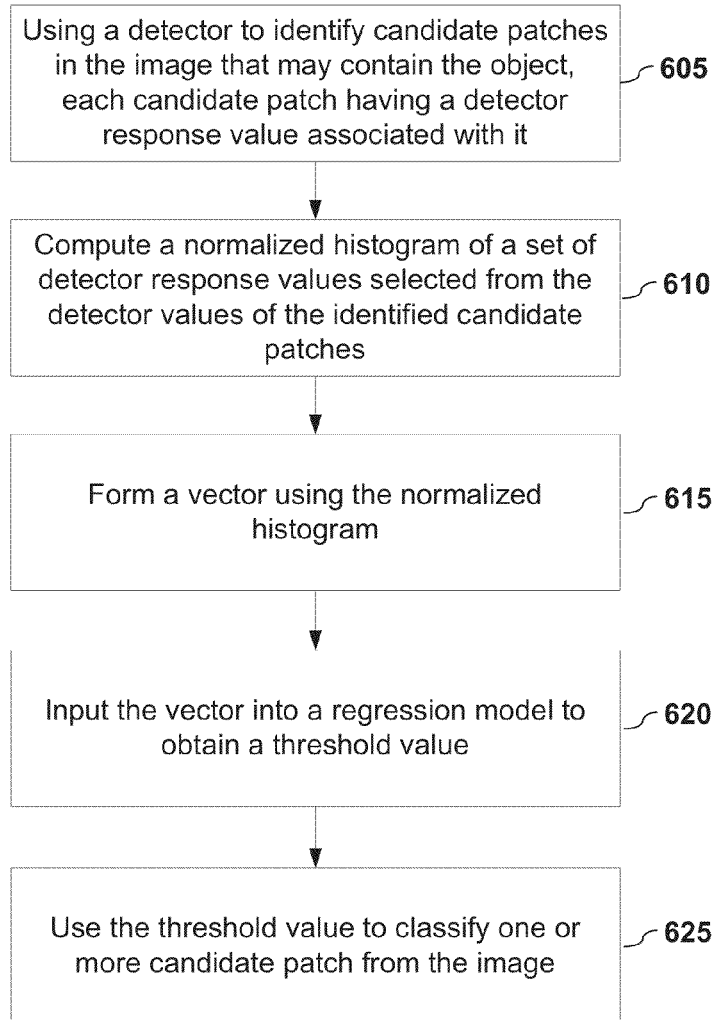
FIG. 6 depicts a method for using a detection system that includes adaptive thresholding according to embodiments of the present invention.

FIG. 5 depicts a detection system that includes adaptive thresholding according to embodiments of the present invention. The detection system 505 embodiment shown in FIG. 5 comprises an initial detector 510 and an adaptive thresholder 515. In embodiments, the adaptive thresholder 515 comprises a trained adaptive threshold model, which may be obtained as described in the prior section. In embodiments, the adaptive thresholder 515 predicts an optimal threshold value for the input image based upon the trained model and uses this predicted optimal threshold value to classify whether an image patch in the input image contains the object of interest by comparing the image patch's detector response value against this predicted optimal threshold value. FIG. 6 provides an embodiment of the method that may be performed by system 505.

FIG. 6 depicts a method for using an adaptive thresholding detection system according to embodiments of the present invention. As illustrated in FIG. 6, in embodiments, the process commences by obtaining (605) one or more image patches. In embodiments, the set of image patches are obtained from an input image (e.g., image 530 in FIG. 5) using an initial detector (e.g., detector 510). In embodiments, the initial detector may be an existing detector or detectors, such as AdaBoost or SVM; alternatively, other detectors, including contextual boost, may be used. Each candidate image patch has an associated initial detector response value. In embodiments, the confidence value(s) of the initial detector may be set so that the detected images are over-inclusive, thereby reducing the possibility of excluding true positives in the initial detection. As result of being over-inclusive, a large number of false positives will be included; however, the subsequent detection can assist in eliminating these false positives. In embodiments, the image patches may be all scan windows from an input image. It shall be noted that the image patches may be in the form of locations in an image.

Figure 7:
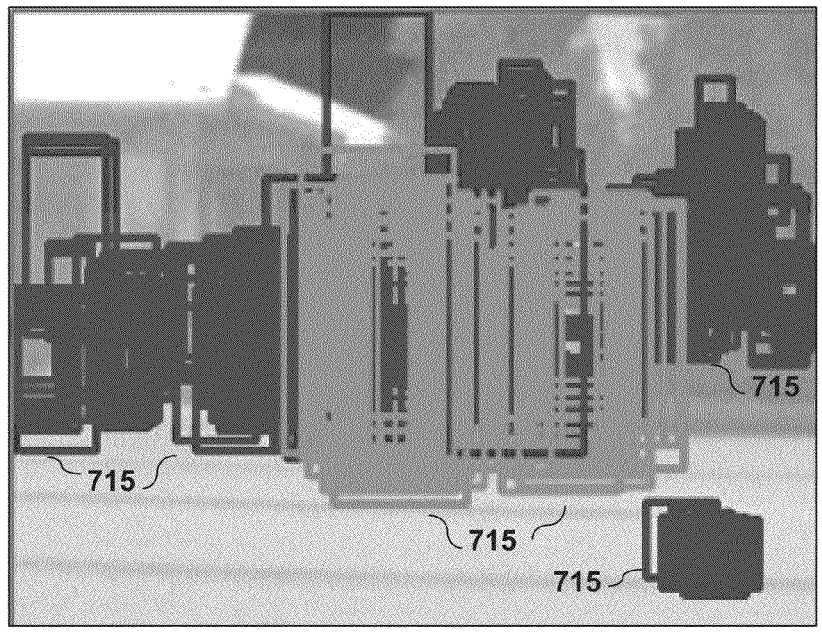
FIG. 7 depicts a sample image with initial image patches having positive detector values and the ground truth for that sample image according to embodiments of the present invention.
Figure 7:
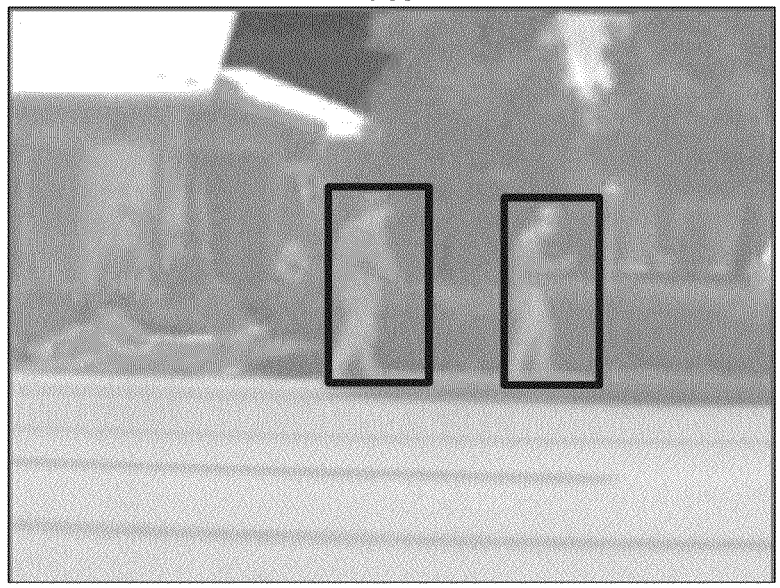

FIG. 7 depicts a sample image with initial image patches 705 having positive detector values and the ground truth 710 for that sample image according to embodiments of the present invention. The sample image is an infrared image of humans. Infrared (IR) images are often used to identify humans because the images are more robust. Infrared images eliminate variations due to clothes, colors, etc. Using a detector, scan windows 715 of human figures have been detected within the image 705. Within the image, the detector detected some image patches that are, in fact, human images (true positives) and quite a few image patches that are not, in fact, human images (false positives). Note that compared to the ground truth image 710 which shows the two human figure image patches, the initial detector has correctly identified the two human figures but also incorrectly identified a host of other image patches as containing human figures when they, in fact, do not contain human figures.

Returning to FIG. 6, the detector values from the set of candidate image patches are used to create (610) a normalized histogram of detector response values. For example, the detector values for the image patches detected in image 705 in FIG. 7 are used to generate a normalized histogram.

In embodiments, the normalized histogram is formed (615) into a vector, which is inputted (620) into an adaptive thresholder (e.g., system 515 in FIG. 5). One skilled in the art shall recognize that generating the histogram from the detector response values and forming the histogram into a vector can be a single step. The input to the trained model is the normalized histogram vector (e.g., histogram 540 in FIG. 5) and the output is a predicted optimal threshold value, which is used for final classification of the image patches. Thus, the trained model uses the input histogram to adaptively determine a threshold value for use with this set of image patches. For example, the detector response values obtained from initial detector 510 for the set of image patches 535 are compared against the adaptive threshold value from the trained model to make a final classification. The result is a smaller set of image patches (e.g., patches 540 in FIG. 5) that has both high precision and high recall.

Figure 8:
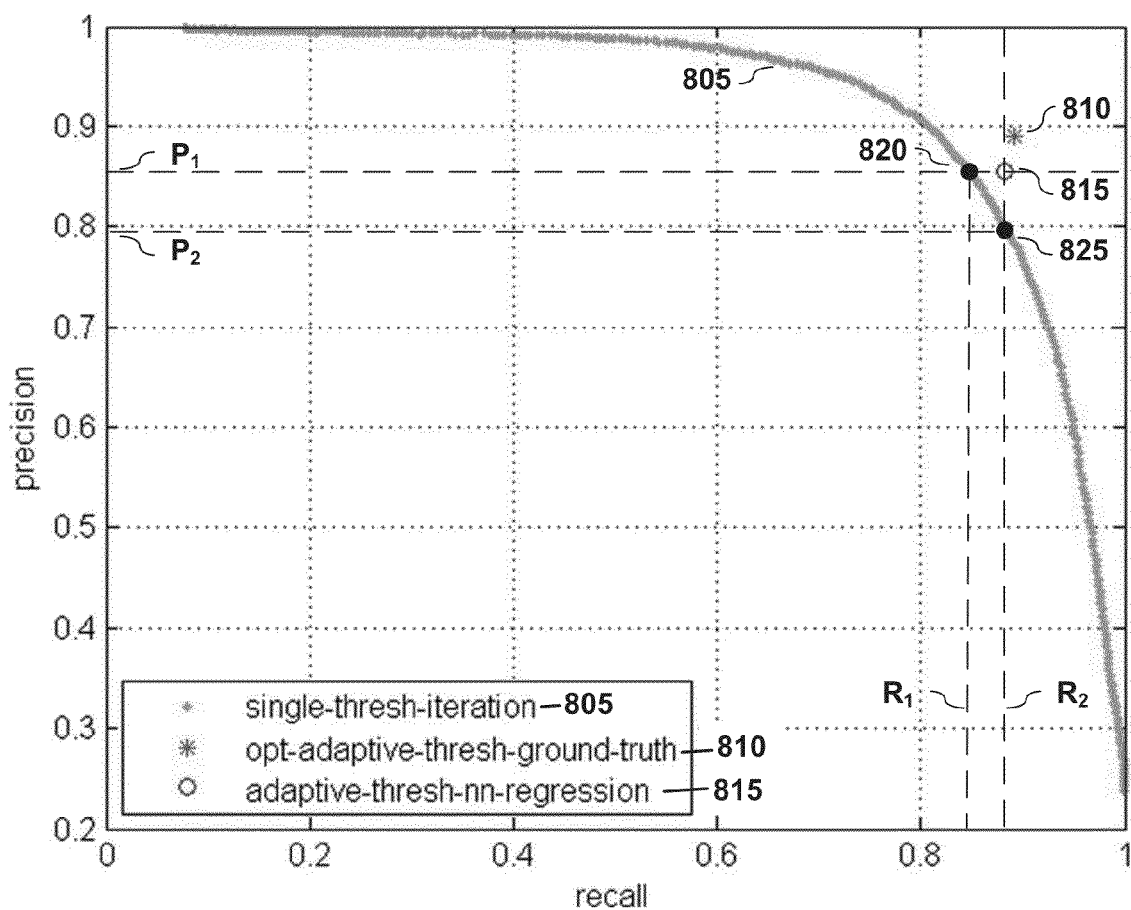
FIG. 8 depicts a comparison of a typical ROC threshold curve, an adaptive threshold value according to embodiments of the present invention, and an optimal threshold value.

FIG. 8 depicts a comparison of various threshold values for the example candidate image patches of FIG. 7. FIG. 8 shows a typical ROC threshold curve 805 that traditionally has been used to setting threshold values. Also shown in FIG. 8 is the adaptive threshold value 815 obtained according to embodiments of the present invention. FIG. 8 further shows the ideal optimal threshold value 810 given the ground truth information. Although the model did not return a threshold value 815 that is exactly the same as the optimal threshold value 810, it is quite close. And, it must be noted that the adaptive threshold value 815 is better than what a traditional ROC curve would yield. Recall that for an ROC curve, a selected threshold value must lie on the curve. Accordingly, to have the same precision value $P_1$ as the adaptive threshold value 815, the point 820 on the ROC curve would yield a lower recall value $R_1$. Likewise, to have the same recall value $R_2$ as the adaptive threshold value 815, the point 825 on the ROC curve would yield a lower precision value $P_2$. Thus, the adaptive threshold value of the current invention provides for better detection results than could be obtained previously.

Figure 9:
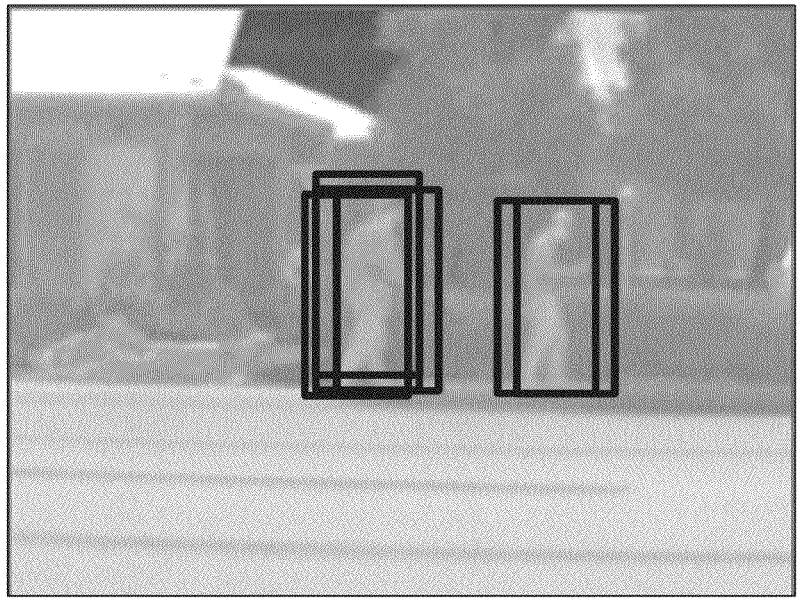
FIG. 9 depicts the detection results for the sample images of FIG. 7 of the adaptive threshold value according to embodiments of the present invention and an optimal threshold value.
Figure 9:
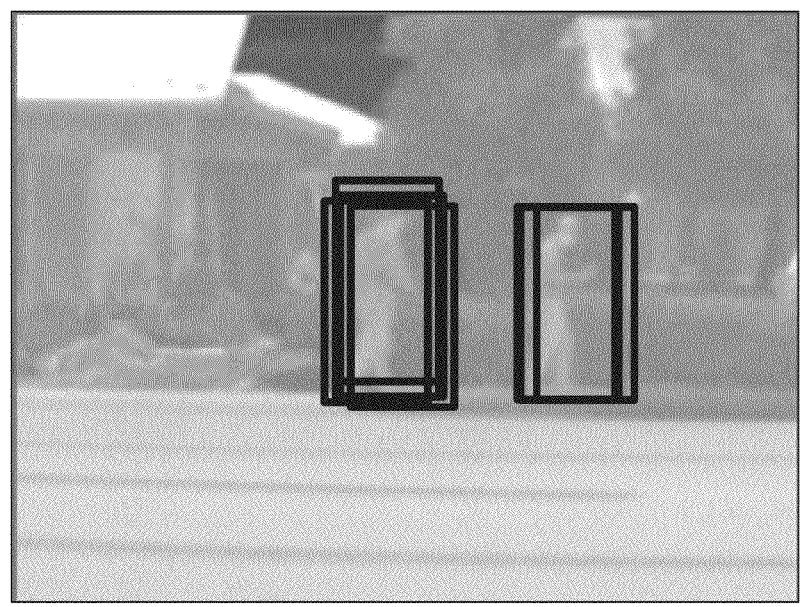

FIG. 9 depicts the detection results for the sample images of FIG. 7 of the adaptive threshold value according to embodiments of the present invention and an optimal threshold value. Image 905 shows the final set of image patches from the initial set of candidate image patches that were selected as containing the objects of interest (in this case human figures) based upon their response values as compared against the adaptive threshold value. Note that only true positive image patches were selected and no false positive image patches were selected. By way of comparison, the second image 910 shows the final set of image patches from the initial set of candidate image patches that were selected as containing human figures based upon their response values as compared against the optimal threshold value. Note the very close results between the two sets of selected image patches.

System Embodiments

Figure 10:
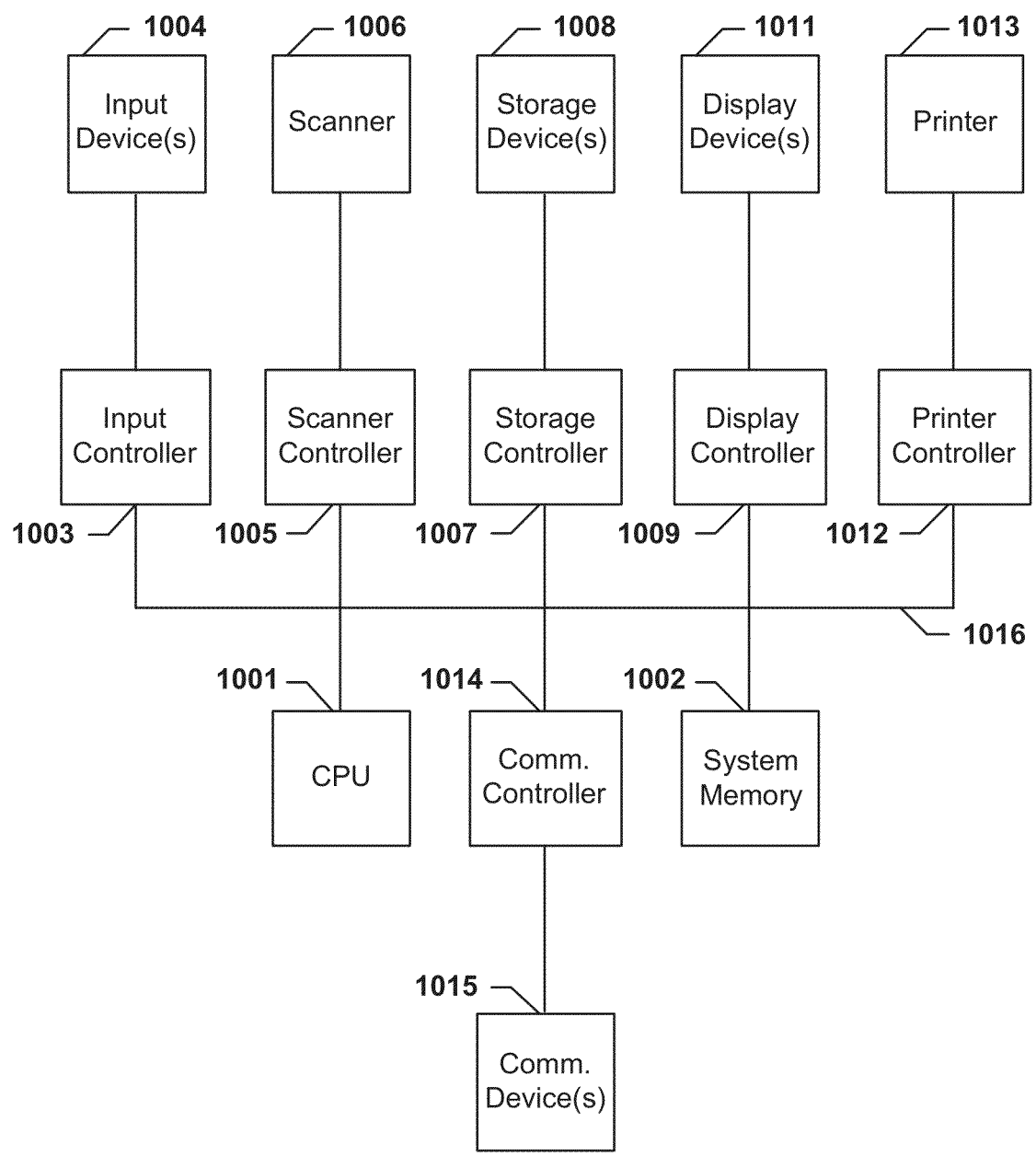
FIG. 10 is a block diagram illustrating an exemplary system which may be used to implement aspects of the present invention.

Having described the details of the invention, an exemplary system 1000, which may be used to implement one or more aspects of the present invention, will now be described with reference to FIG. 10. As illustrated in FIG. 10, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 10. An input controller 1003 represents an interface to various input device(s) 1004, such as a keyboard, mouse, or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), a thin film transistor (TFT) display, or other type of display. The system 1000 may also include a printer controller 1012 for communicating with a printer 1013. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution on a computer-readable medium. Alternatively, any of the methods or steps thereof may be implemented using functionally equivalent hardware (e.g., application specific integrated circuit (ASIC), digital signal processing circuitry, etc.) or a combination of software and hardware. In embodiments, one or more of the methods may be implemented using one or more processing units/systems.

While the inventions have been described in conjunction with several specific embodiments, it is evident to those skilled in the art that many further alternatives, modifications, and variations will be apparent in light of the foregoing description. Thus, the inventions described herein are intended to embrace all such alternatives, modifications, applications and variations as may fall within the spirit and scope of the appended claims.

What is claimed is:

1. A computer-implemented method to detect an object in an input image, the method comprising:

submitting said input image to a classifier for initial object detection, said classifier being already trained to detect said object, said classifier identifying multiple image regions within said input image and assigning each image region a detector response value indicative of a likelihood of the object, being within the image region, each image region whose detector response value is not less than a first threshold value being classified as containing the object and being designated a candidate patch;

collecting candidate patches to form a set of candidate patches from the input image, each candidate patch having its corresponding detector response value associated with it;

using a trained model to determine a second threshold value based on the detector response values candidate of the candidate patches in the set of candidate patches;

re-classifying all the candidate patches using the second threshold value, wherein each candidate patch whose associated detector response value is not less than the second threshold value is classified as containing the object, and each candidate patch whose associated detector response value is less than the second threshold value is re-classified as not containing the object.

2. The computer-implemented method of claim 1 wherein the set of candidate patches includes all the candidate patches, and the second threshold value is determined based on all the detector response values of all the candidate patches.

3. The computer-implemented method of claim 2 wherein the classifier is an AdaBoost classifier or a Support Vector Machine classifier.

4. The computer-implemented method of claim 1 wherein the training of the trained model is based on classification results of a plurality of training image regions extracted from individual training images of a library of training images, and based on manually assigned ground truth classifications for the training image regions.

5. The computer-implemented method of claim 1 wherein the trained model is configured to select a threshold value based upon one or more criteria.

6. The computer-implemented method of claim 5 wherein the one or more criteria comprises obtaining a threshold that attempts to minimize the number of false positive images patches and to maximize the number of true positive image patches.

7. The computer-implemented method of claim 1 wherein the detector response values of set of candidate patches are computed into a normalized histogram, the trained model uses the normalized histogram to determine a second threshold value, the normalized histogram forming a vector.

8. A non-transitory computer-readable medium comprising one or more sets of instructions which, when executed by one or more processors, causes the one or more processors to perform a method for detecting an object in an input image comprising the steps of:

submitting said input image to a classifier for initial object detection, said classifier being already trained to detect said object, said classifier identifying multiple image regions within said input image and assigning each image region a detector response value indicative of a likelihood of the object being within the image region, each image region whose detector response value is not less than a first threshold value being classified as containing the object and being designated a candidate patch;

collecting candidate patches to form a set of candidate image patches from the input image, each candidate image patch having its corresponding detector response value associated with it;

computing a normalized histogram of the associated detector response values of the candidate image patches in the set of candidate image patches;

using an adaptive threshold model to determine a second threshold value based on normalized histogram;

re-classifying one or more selected candidate image patches using the second threshold value, wherein each selected candidate image patch whose associated detector response value is not less than the second threshold is classified as containing the object, and each selected candidate image patch whose associated detector response value is less than the second threshold value is re-classified as not containing the object.

9. The non-transitory computer-readable medium of claim 8 wherein the set of candidate patches includes all the candidate patches.

10. The non-transitory computer-readable medium of claim 8 wherein the adaptive threshold model is a neural network trained on classification results of a plurality of training image regions extracted from individual training images of a library training images and train on manually assigned ground truth classifications for the training image regions.

11. The non-transitory computer-readable medium of claim 8 wherein the adaptive threshold model is configured to select a threshold value based upon one or more criteria.

12. The non-transitory computer-readable medium of claim 11 wherein the one or more criteria comprises attempting to minimize the number of false positive image patches and to maximize the number of true positive image patches.

13. The non-transitory computer-readable medium of claim 8 wherein the normalized histogram forms a vector.

\* \* \* \* \*